Sept. 19, 1933.  W. DOBLE  1,927,204
STEAM POWER PLANT
Filed April 18, 1930   4 Sheets-Sheet 1
FIG_1_
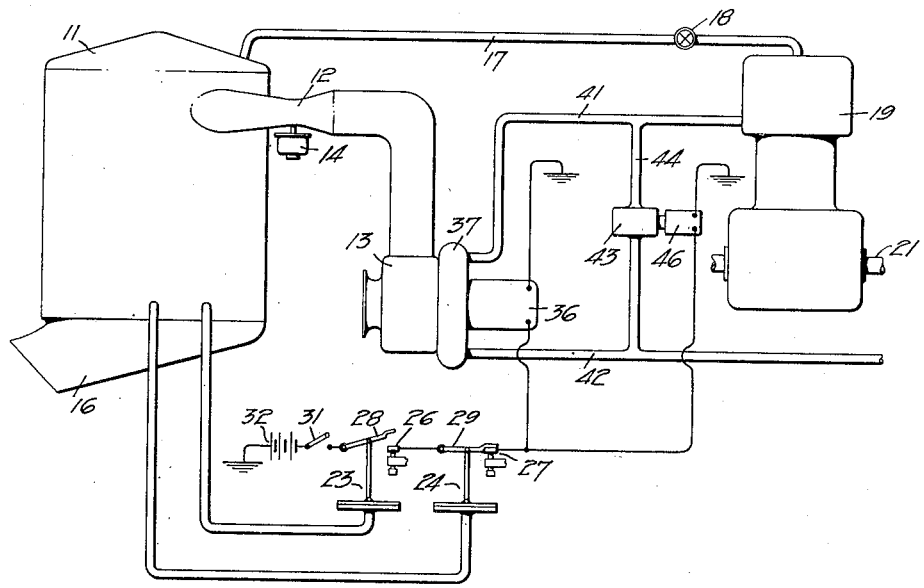
INVENTOR.
Warren Doble
BY
White, Prost, Hehr + Lothrop
ATTORNEYS.

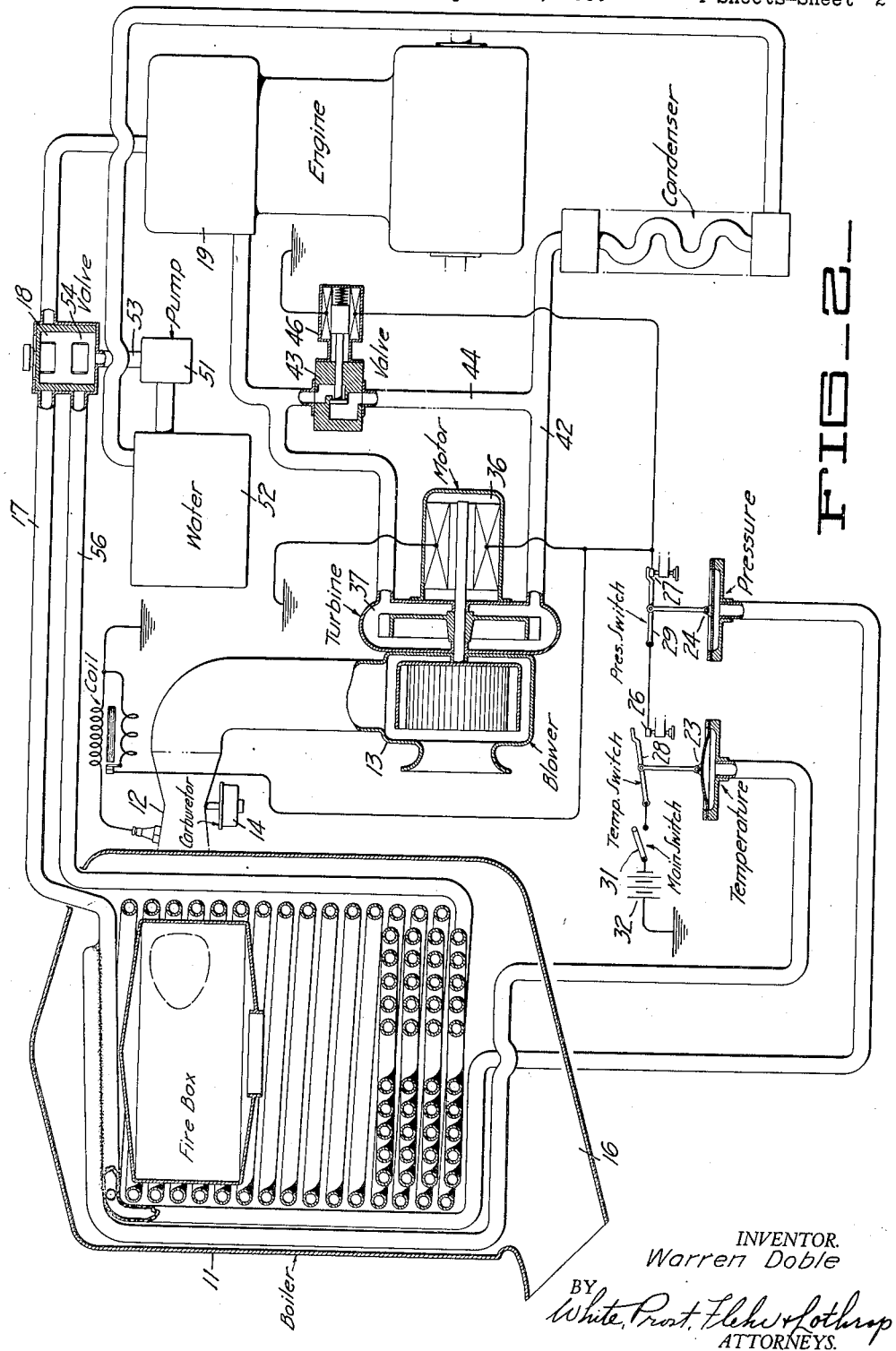

Sept. 19, 1933.           W. DOBLE                1,927,204
                       STEAM POWER PLANT
                    Filed April 18, 1930      4 Sheets-Sheet 3
FIG_3_
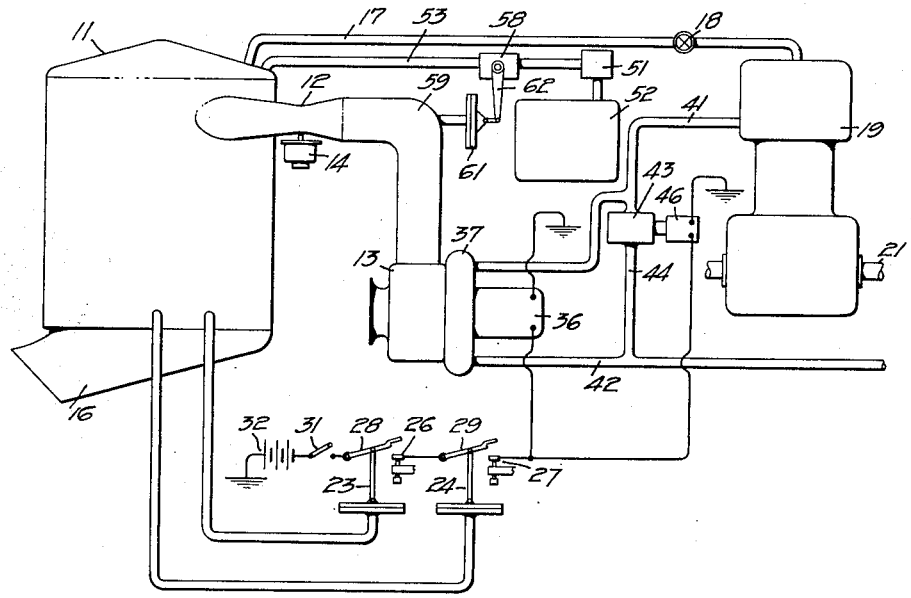
FIG_4_
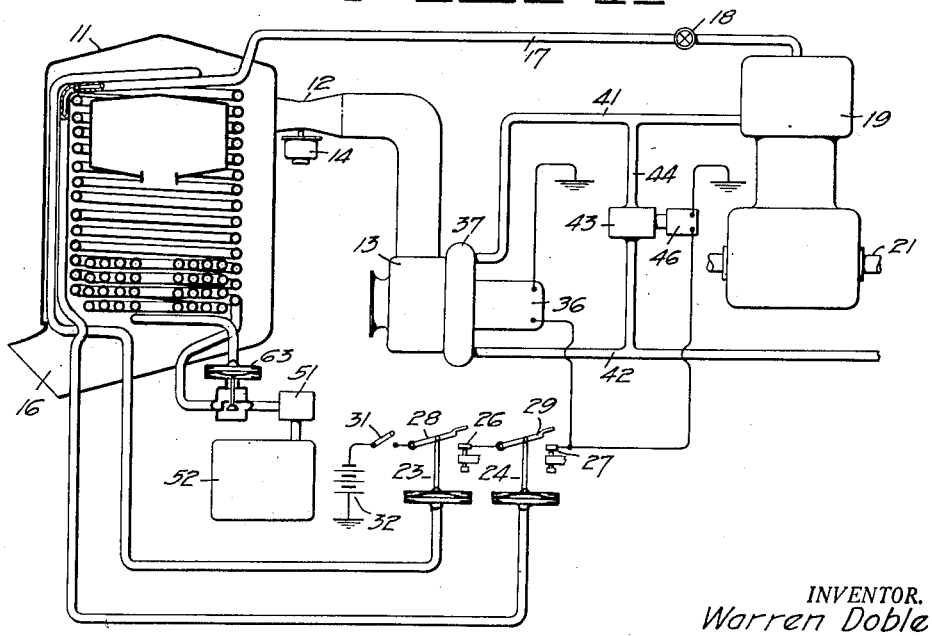
INVENTOR.
Warren Doble
BY
White, Prost, Flehr & Lothrop
ATTORNEYS.

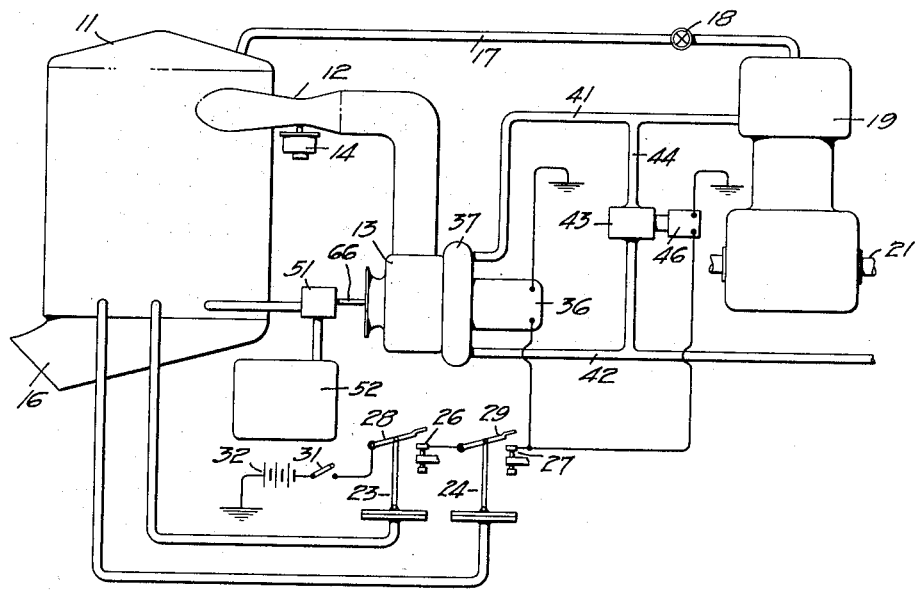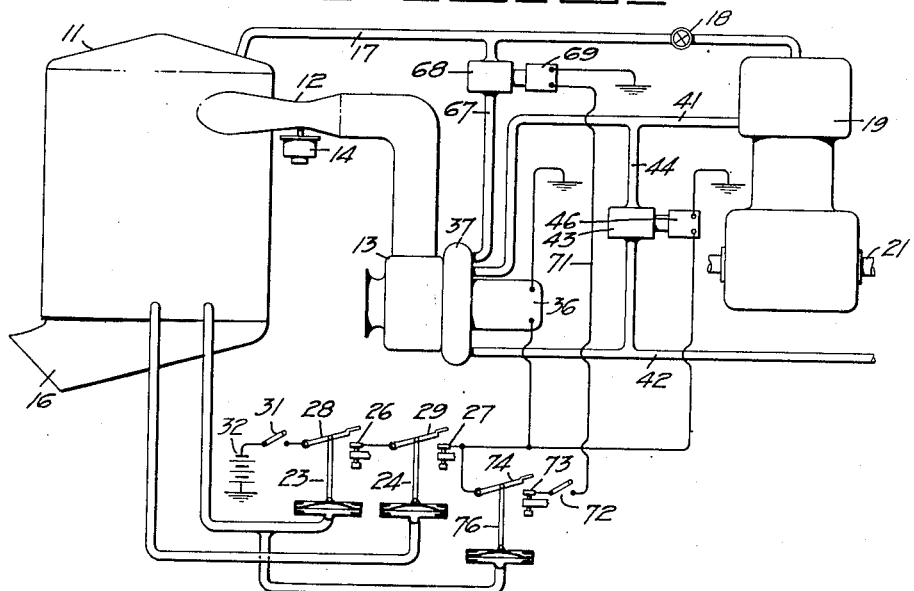

Patented Sept. 19, 1933

1,927,204

UNITED STATES PATENT OFFICE 1,927,204

STEAM POWER PLANT

Warren Doble, Emeryville, Calif.

Application April 18, 1930. Serial No. 445,301

11 Claims. (Cl. 60—106)

This invention relates to a power plant employing a fluid heater which generates a vapor or fluid such as steam. It has been employed with particular success in power plants relatively small in physical size but which are capable of delivering large quantities of the fluid having certain predetermined characteristics. Such a power plant has been installed and operated in an automotive vehicle steam being used as the fluid. I shall, therefore, preferably disclose it in that connection.

In the fluid heater or boiler employed in the mentioned form of my invention, the heat is supplied by igniting an air and fuel mixture provide by blowing air through a carburetion device, the air being furnished by a blower driven by an electric motor. A storage battery ordinarily is the source of the electrical energy. Necessarily, therefore, the maximum speed of the blower is dictated by the power available from the battery. To obviate excessive space requirements and weight, it is desirable to furnish power for the motor from a relatively small size of battery, such as is conveniently commercially available. Operation of the blower motor by electricity at a higher rate of speed to furnish more air is not feasible since this entails not only a larger motor but also an increased number of batteries or the use of special batteries. For instance, since the power required varies with the cube of the speed, in order to double the speed possible with one battery eight batteries are needed. These expedients are not acceptable to the buying public and are not structurally feasible. Accordingly, in commercial practice prior to my invention the quantity of heat furnished to the boiler has been restricted to that available by use of a blower motor of reasonable size operated by a single battery. This quantity of heat is relatively small and is insufficient to enable the boiler to furnish steam having the desired characteristics, i. e., temperature and pressure rapidly or in large amounts.

In accordance with my invention I provide a power plant which is capable of supplying steam of the desired characteristics rapidly and under greatly increased demand by supplementing the electric motor. The supplementary means supplies heat to the boiler in substantial accordance with the demand thereon for steam. The advantages and economies presented thereby are considerable.

I prefer to control the supply of heat in accordance with such boiler conditions as temperature and pressure. When an increased quantity of heat is supplied to the boiler with only the ordinary amount of water, the steam temperature rises and the temperature responsive means discontinues the supply of heat even though the steam pressure is not as great as it should be.

Since a large amount of additional heat is available by virtue of my invention, I preferably supply to the boiler water in addition to that ordinarily supplied so that a greatly increased quantity of steam of the desired characteristics can be furnished. Further, by furnishing additional water and by properly regulating the supply, the increased quantity of heat is useful in producing more steam and the system is not hampered by premature discontinuance of the heat supply due to excessive steam temperature.

While it is a general object of the present invention to overcome the difficulties outlined above, the invention possesses other advantageous objects and features some of which, with the foregoing, will be set forth in the following description and in the drawings accompanying and forming part of this specification. In the drawings I have shown forms of steam power plants embodying my invention, but it is to be understood that the invention is not limited to these forms since it may be embodied in others as well.

In the drawings, Fig. 1 is a diagrammatic representation of a steam power plant embodying certain features of my invention.

Fig. 2 is a diagrammatic showing of a steam power plant in which additional water may be supplied to the boiler in accordance with the throttle valve setting.

Fig. 3 is a diagrammatic showing of a steam power plant in which additional water is supplied to the boiler in accordance with the pressure supplied by the blower.

Fig. 4 is a diagrammatic representation of a steam power plant in which water is supplied to the boiler in response to boiler conditions.

Fig. 5 is a diagrammatic representation of another steam plant embodying my invention.

Fig. 6 is a diagrammatic showing of a steam power plant in which steam to operate the turbine can be supplied either from the exhaust of the engine or directly from the boiler.

In the preferred form of my invention, a boiler 11, usually of the series tube type, is supplied with a combustible fuel-air mixture through a venturi 12, the fuel being aspirated by air from a blower 13 passing over a carburetor 14. The fuel is ignited by any suitable means and the products of combustion pass out of the boiler through an exhaust hood 16. The steam generated in the boiler is conducted through a line 17, the flow being controlled by a throttle 18, to a steam engine 19 operating a drive shaft 21 to move the vehicle.

Conditions in the boiler are preferably made effective to control the supply of combustible mixture to the boiler. Thus, devices 23 and 24 are responsive, respectively, to steam temperature and pressure within the boiler and regulate the blower 13 according to predetermined conditions of boiler temperature and pressure. The devices 23 and 24 respectively include adjustable contacts 26 and 27 and movable contacts 28 and 29. These contacts are included in series in an electrical circuit which also includes a master switch 31 and a battery 32. The battery is an ordinary electric storage battery, usually of twelve volts, such as is available commercially. When the circuit is closed through the switch and the various contacts, the battery supplies power to a motor 36 which operates the blower 13 at a relatively fixed speed.

I customarily arrange the responsive devices 23 and 24 so that they interrupt the electric circuit when the pressure or temperature is high and so that they complete their respective portions of the circuit when the pressure or temperature is low.

I have found that an advantageous way of increasing the speed of the blower 13 to augment the quantity of heat is to position a steam turbine 37 on the shaft connecting the motor 36 and the blower 13. The turbine is preferably arranged to be driven by exhaust steam conducted from the engine 19 through a conduit 41 extending to the turbine. The steam is exhausted from the turbine through a discharge conduit 42 which conveys the steam to the atmosphere or to a condenser.

In those forms of my invention illustrated in Figs. 1 to 5, inclusive, I provide means for operating the turbine and the motor in unison. A valve 43 controls the flow of exhaust steam through a by-pass 44 connecting the conduits 41 and 42 and shunting the turbine 37. All of the steam exhausted by the engine 19 passes through the turbine when the valve 43 is closed, but substantially all of the exhaust steam is by-passed when the valve 43 is open. Operation of the valve is accomplished by joining suitable means such as a solenoid 46 to the valve and including the solenoid in series with the master switch and the several responsive devices 23 and 24. The arrangement is preferably such that the valve is open when the motor 36 is de-energized and is closed when the motor is energized. Since the turbine operates on exhaust steam from the engine 19, the quantity of heat furnished the boiler is in accordance, substantially, with the demand for steam by the engine.

The efficacy of the turbine to increase the supply of heat is illustrated by a practical instance in which a draft of two and one-half inches of water when a standard motor operated alone was increased to sixteen inches of water when the motor and turbine operated together. This increase is so great that for some installations, I am enabled even to reduce the size of the electric motor and accompanying storage battery, relying upon the motor alone only for a minimum draft as in starting from cold. I have found, however, that in most cases, it is advantageous to supply additional water to the boiler so that the increased quantity of heat available upon the operation of the blower at high speed is effective to generate more steam. Otherwise, the steam temperature is quickly increased and further superheats the steam so that the temperature responsive device 23 breaks the circuit.

In Figure 2 I have shown a structure by which the supply of feed water can be increased. A pump 51 withdraws water from a tank 52 and discharges through a conduit 53 to a control valve 54. The control valve is associated with the throttle valve 18 and is so related to it that the control valve and the throttle valve open and close in unison. As the throttle opens, the control valve correspondingly opens and allows water to pass from the pump discharge conduit 53 into an inlet conduit 56 to the boiler. The control valve 54 closes as the throttle 18 closes.

In Figure 3 I have shown another way of supplying additional water. In this form of my invention, a controller 58 governs flow through the outlet conduit 53 from the pump in accordance with the pressure in the blower discharge 59. A pressure responsive device 61 in communication with the blower discharge operates a lever arm 62 connected to the controller 58. Since the pressure in the blower discharge 59 is increased, for example, from about 2½ inches of water to 16 inches of water when the turbine 37 supplements the electric motor 36, the pressure responsive device 61 operates the controller 58 so that more water is furnished the boiler when the turbine is used.

In the form of the invention illustrated in Figure 4, the discharge of the pump 51 is separately controlled by a device 63 which is responsive to any suitable boiler condition or conditions such as the temperature of the exhaust gases, for example; that is, as the temperature of the exhaust gases increases, the flow of water is increased while when the temperature of the exhaust gases decreases, the flow of water is decreased.

In the form of the invention shown in Figure 5, the water pump 51 is connected to the shaft 66 upon which the blower 13, turbine 37 and electric motor 36 are positioned. Under these circumstances, the pump is effective to supply fluid to the boiler substantially in direct proportion to the speed of operation of the blower. When the blower speed is increased by operation of the turbine, the pump supplies additional water so that the increased quantity of heat is utilized to furnish more steam of the desired characteristics.

In Figure 6 there is shown an arrangement which provides for the operation of the turbine with exhaust steam from the engine, with steam taken directly from the boiler or with both. The admission of exhaust steam to the turbine is provided for in the previously described manner. To admit steam directly from the boiler, I provide a duct 67 communicating with the boiler outlet line 17 and with the turbine 37. Flow of steam through the duct 67 is controlled by a valve 68 operated by a solenoid 69. The solenoid is in a circuit 71 which includes a manual switch 72, an adjustable contact 73 and a contact 74. The contact 74 is movable by an element 76 in response to a change in any suitable boiler condition such as steam temperature. The switch 72 and controls 73 and 74 are in series with the devices 23 and 24 so that current is supplied from the battery when operating conditions are effective to close these devices. By drawing steam directly from the boiler, the turbine 37 is effective to drive the blower 13 independently of the operation of the engine. This is particularly valuable when starting from cold as it enables rapid steaming as soon as even a small amount of boiler steam is available. However, the operation of this device can be interrupted at any time by opening manual switch 72.

I claim:

1. A steam power plant comprising a boiler, a burner for said boiler, means for supplying fuel to said burner, a blower for supplying air with said fuel to said burner, an electric motor for driving said blower, a steam turbine for driving said blower concurrently with said motor when steam is supplied to said turbine, and means responsive to boiler temperature for simultaneously controlling said electric motor and said steam turbine.

2. A steam power plant comprising a boiler, a burner for said boiler, a blower for supplying combustion air to said burner, a motor for driving said blower, a turbine for driving said blower concurrently with said motor when steam is supplied to said turbine, and means responsive to boiler pressure for simultaneously controlling said motor and said turbine.

3. A steam power plant comprising a boiler, a burner for said boiler, means for supplying combustion air to said burner, electrically operated means for driving said supplying means, vapor operated means for assisting said electrically operated means in driving said supplying means, and means responsive to boiler pressure for simultaneously controlling said electrically operated means and said vapor operated means.

4. A steam power plant comprising a boiler, a burner for said boiler, a blower for supplying combustion air to said burner, an electric motor permanently coupled to said blower, a steam turbine permanently coupled to said blower, said turbine and said motor concurrently driving said blower when steam is supplied to said turbine, and means for simultaneously controlling said motor and said turbine.

5. A steam power plant comprising a boiler, a burner for said boiler, means for supplying combustion air to said burner, an electric motor for driving said supplying means, means for augmenting said electric motor in driving said supplying means, and means responsive to boiler temperature or pressure for simultaneously controlling said motor and said augmenting means.

6. A steam power plant comprising a boiler, a burner for said boiler, a blower for furnishing a supply of combustion air to said burner, an electric motor for driving said blower, a steam turbine for driving said blower concurrently with said motor when steam is supplied to said turbine, and means responsive to temperature of said boiler for controlling said supply of combustion air.

7. A steam power plant comprising a boiler, a burner for said boiler, a blower for furnishing combustion air to said burner, an electric motor for driving said blower, a steam turbine for driving said blower concurrently with said motor when steam is supplied to said turbine, an electromagnetic valve for governing steam flow to said turbine, an electric circuit including said motor and said electromagnetic valve, and means responsive to boiler temperature for controlling said circuit.

8. A steam power plant comprising a boiler, a burner for said boiler, a blower for furnishing combustion air to said burner, an electric motor for driving said blower, a steam turbine for driving said blower concurrently with said motor when steam is supplied to said turbine, electrical means for controlling said turbine, and an electric circuit including said motor and said electrical means for controlling said blower.

9. A steam power plant comprising a boiler, a burner for said boiler, means driven by electricity and by steam for supplying combustion air to said burner, means for concurrently supplying steam and electricity to said driven means, and means responsive to a boiler temperature or pressure for simultaneously controlling said means for supplying steam and electricity.

10. A steam power plant comprising a boiler, a burner for said boiler, a blower driven by an electric motor and by a steam turbine for supplying combustion air to said burner, said motor and said turbine concurrently driving said blower when steam is supplied to said turbine, means for supplying electricity to said motor, means for supplying steam to said turbine, and means responsive to a boiler condition, such as steam temperature, boiler tube temperature, or steam pressure, for simultaneously controlling said means for supplying electricity and said means for supplying steam.

11. A steam power plant comprising a boiler, a burner for said boiler, a blower for supplying combustion air to said burner, an electric motor for driving said blower, a steam turbine for driving said blower concurrently with said motor when steam is supplied to said turbine, an engine driven by steam from said boiler, means for conducting exhaust steam from said engine to said blower, electrically responsive means for by-passing said steam around said turbine, an electric circuit connecting said motor and said responsive means for controlling said motor and said responsive means, and means responsive to boiler temperature for controlling said circuit.

WARREN DOBLE.